United States Patent
Son et al.

(10) Patent No.: US 12,514,805 B2
(45) Date of Patent: Jan. 6, 2026

(54) COMPOSITION FOR SUPPRESSING SKIN IRRITATION OR INHIBITING SEBUM SECRETION

(71) Applicant: AMOREPACIFIC CORPORATION, Seoul (KR)

(72) Inventors: Euidong Son, Yongin-si (KR); Insup Kil, Yongin-si (KR); Si Young Cho, Yongin-si (KR); Wonseok Park, Yongin-si (KR); Yong Deog Hong, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 346 days.

(21) Appl. No.: 18/153,467

(22) Filed: Jan. 12, 2023

(65) Prior Publication Data
US 2023/0363997 A1 Nov. 16, 2023

(30) Foreign Application Priority Data

May 10, 2022 (KR) .................. 10-2022-0057154
Jun. 7, 2022 (KR) .................. 10-2022-0069140

(51) Int. Cl.
*A61K 8/49* (2006.01)
*A61Q 19/00* (2006.01)

(52) U.S. Cl.
CPC ............ *A61K 8/498* (2013.01); *A61Q 19/004* (2013.01); *A61Q 19/005* (2013.01)

(58) Field of Classification Search
CPC ..... A61K 8/498; A61Q 19/004; A61Q 19/005
See application file for complete search history.

(56) References Cited

U.S. PATENT DOCUMENTS

| | | |
|---|---|---|
| 2010/0278784 A1 | 11/2010 | Pojasek et al. |
| 2016/0324824 A1 | 11/2016 | Rho et al. |
| 2018/0078522 A1 | 3/2018 | Kim et al. |
| 2018/0177702 A1 | 6/2018 | Kim et al. |

FOREIGN PATENT DOCUMENTS

| | | |
|---|---|---|
| CN | 100389743 C | 5/2008 |
| CN | 105873584 A | 8/2016 |
| CN | 107920975 A | 4/2018 |
| KR | 10-0482668 B1 | 4/2005 |
| KR | 10-2003-0015654 A | 2/2023 |
| NO | 2004/000836 A1 | 12/2003 |
| WO | WO-2008143928 A1 * | 11/2008 ........... A61K 31/203 |

OTHER PUBLICATIONS

Sahu, S. and Yosipovitch, G. "Itch and pain intensity in skin cancer: Why should dermatological surgeons assess it?" Clinics in Dermatology 2021, 39, pp. 119-122 (Year: 2021).*
Mi-Sun Kim et al., "The effects of a novel synthetic retinoid, seletinoid G, on the expression of extracellular matrix proteins in aged human skin in vivo", Clinica Chimica Acta, 2005, vol. 362, pp. 161-169.
Eun-Soo Lee et al., "Synthetic Retinoid Seletinoid G Improves Skin Barrier Function through Wound Healing and Collagen Realignment in Human Skin Equivalents", Int. J. Mol. Sci., 2020, vol. 21, No. 3198, pp. 1-12.
H.S, Rho et al., "Development of Novel Pyrone Derivative Retaining Retinoidal Anti-aging Activity with Low Skin Irritation", Proceedings of the SCSK Conference, 2003, pp. 184-191.
Ji Young Yoon et al., "Epigallocatechin-3-Gallate Improves Acne in Humans by Modulating Intracellular Molecular Targets and Inhibiting P. acnes", Journal of Investigative Dermatology, 2013, vol. 133, pp. 429-440.
Partial European Search Report issued on Oct. 19, 2023, in EP23153961. 0-1109, 13 pgs.
Extended European Search Report issued in EP 23153961.0 dated Feb. 19, 2024 (16 pages).
Kim, Sae On, et al., "Kojyl cinnamate esters are peroxisome proliferator-activated receptor $\alpha/\gamma$ dual agonists", Bioorganic & Medicinal Chemistry, 2018, vol. 26, pp. 5654-5663.

* cited by examiner

*Primary Examiner* — Frederick F Krass
*Assistant Examiner* — Toriana N. Vigil
(74) *Attorney, Agent, or Firm* — Rothwell, Figg, Ernst & Manbeck, P.C.

(57) ABSTRACT

The disclosure relates to the method for alleviating skin irritation or inhibiting sebum production, which includes administering a composition including a compound represented by Chemical Formula 1, a salt thereof, a stereoisomer thereof, a hydrate thereof, or a solvate thereof as an active ingredient to a subject in need of alleviating skin irritation or inhibiting sebum production, and specifically the composition can alleviate the irritation of the skin stimulated by ultraviolet rays, and more specifically, the composition can alleviate the skin irritation by reducing inflammatory factors in the cells of the skin stimulated by simultaneous stimulation of UVA and UVB ultraviolet rays, and in addition, specifically, it is possible to suppress the sebum production by inhibiting intracellular lipid synthesis with the composition, and more specifically, the sebum production of the skin can be suppressed by reducing the expression level of the factors related to intracellular lipid synthesis with the composition.

9 Claims, 4 Drawing Sheets

COMPOSITION FOR SUPPRESSING SKIN IRRITATION OR INHIBITING SEBUM SECRETION

CROSS REFERENCE TO RELATED APPLICATION

The present application claims priority to Korean Patent Application No. 10-2022-0057154, filed May 10, 2022, the entire contents of which is incorporated herein for all purposes by this reference. The present application claims priority to Korean Patent Application No. 10-2022-0069140, filed Jun. 7, 2022, the entire contents of which is incorporated herein for all purposes by this reference.

BACKGROUND OF THE INVENTION

Field of the Invention

The present disclosure relates to a composition for alleviating skin irritation or suppressing sebum secretion.

Description of the Related Art

Skin irritation refers to a dermatologically sensitive reaction to external irritants, allergens, environmental changes, or internal causes of the human body to cause irritation or dermatitis. Generally speaking, skin irritation refers to cases where the skin feels unbearable when applying cosmetics. Here, the unbearable feeling refers to itching, stinging, burning, pulling, etc. subjectively felt in response to a stimulus. Objectively, it could be flaking, redness, rashes, blisters, etc.

Recently, it is known that skin irritation is increasing due to wearing a mask in a pandemic situation due to coronavirus infection, rapid temperature change between seasons, and use of cosmetics, and in particular, it is known that skin troubles caused by ultraviolet rays increase. Skin irritation can be exacerbated by excessive UV exposure. Ultraviolet rays are classified into UVA, UVB, and UVC according to their wavelength. Among them, an UVA has a long wavelength of 320 to 400 nm, and when the skin is exposed to the UVA for a long time, the UVA can reach the dermis and cause skin irritation. UVA has a medium wavelength of 290 to 320 nm and can reach the stratum epidermal layer or the epidermis layer, thereby causing irritation to the skin in a short time. In order to alleviate skin irritation increased by the UVA and UVB stimulation, there is a need for a material that reduces the expression of inflammatory factors in skin cells related to skin irritation.

Meanwhile, sebum is a secretion from the sebaceous glands in the skin, and plays a role in maintaining moisture in the skin including the scalp and face or preventing the invasion of microorganisms. During puberty, the sebaceous glands in the skin proliferate due to an increase in the amount of testosterone found in both men and female. The proliferation of these sebaceous glands produces sebum, which blocks hair follicles and provides favorable conditions for bacterial growth. Bacteria reside in hair follicles, and even if these bacteria are present on the skin of a person with normal skin condition, there is no problem at all. However, as the hair follicles are clogged and sebum accumulates in the hair follicles, bacteria eat the sebum and grow rapidly, which is the main cause of skin troubles. In particular, the grown bacteria destroy the hair follicle wall, and the detached cells at this time, sebum, and bacteria cause pus and swelling to form acne, and cause many cosmetic problems such as oily skin, makeup deterioration, and enlarged pores. This chemical change in the skin causes healthy weakly acidic skin to become alkalized as the pH balance of oil is broken, eventually leading to deterioration of the skin's own function and causing a vicious cycle in the skin.

In order to prevent and alleviate such skin troubles, research on methods of suppressing sebum secretion are being actively conducted. Androgen, a male hormone produced and metabolized in the sebaceous gland, promotes the lipid synthesis pathway by increasing gene expression of transcription factors involved in lipid synthesis. These lipid metabolism-related factors commonly have a transcriptional regulatory region called sterol regulatory element (SRE), and androgens regulate these factors by regulating sterol regulatory element-binding proteins (SREBPs) that bind to SREs. The factors involved in lipid metabolism include fatty acid synthase (FAS), acetyl-CoA carboxylase (ACACA), malic enzyme, ATP-citric lyase, sterol-regulatory element binding protein (SREBP), and the like. Although the discovery of materials that suppress the production of sebum by reducing the expression of these lipid metabolic factors is being actively conducted, studies on materials that have fewer side effects such as skin irritation and can be effectively delivered are required.

SUMMARY OF THE INVENTION

In one aspect, the present invention is to provide a composition for alleviating skin irritation.

In one aspect, the present invention is to alleviate skin irritation due to UV stimulation.

In one aspect, the present invention is to alleviate skin irritation to simultaneous stimulation of UVA and UVB.

In one aspect, the present invention is to provide a composition for suppressing sebum production.

In one aspect, the present invention is to suppress sebum production by reducing intracellular lipid synthesis.

In order to achieve the above objects, in one aspect, the present invention provides a method for alleviating skin irritation, which comprises administering a composition comprising a compound of Chemical Formula 1, a salt thereof, a stereoisomer thereof, a hydrate thereof, or a solvate thereof as an active ingredient to a subject in need of alleviating skin irritation or suppressing the production of sebum.

[Chemical Formula 1]

In one aspect, the composition can alleviate skin irritation, in another aspect, the composition can alleviate skin irritation due to UV stimulation, and in still another aspect, the composition can alleviate skin irritation due to simultaneous stimulation of UVA and UVB stimulation.

In another aspect, the composition may suppress sebum production, and in another aspect, the composition may suppress sebum production by inhibiting intracellular lipid synthesis.

DETAILED DESCRIPTION OF THE INVENTION

In the present specification, the salt may be a pharmaceutically acceptable salt. As used herein, "pharmaceutically acceptable" means approved by a regulatory agency of the government or an international organization or listed in the Pharmacopoeia or other generally recognized pharmacopoeia for use in animals, more specifically in humans, since significant toxic effect can be avoided when used with a common medicinal dosage.

As used herein, "pharmaceutically acceptable salt" refers to a salt which is pharmaceutically acceptable and exhibits the desired pharmacological activity of its parent compound.

As used herein, "salt thereof" or "pharmaceutically acceptable salt" refers to (1) an acid addition salt formed from an inorganic acid such as hydrochloric acid, hydrobromic acid, sulfuric acid, nitric acid, phosphoric acid, etc., or an organic acid such as acetic acid, propionic acid, hexanoic acid, cyclopentane propionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl)benzoic acid, cinnamic acid, mandelic acid, methanesulfonic acid, ethanesulfonic acid, 1,2-ethane disulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo[2,2,2]-oct-2-ene-1-carboxylic acid, glucoheptonic acid, 3-phenylpropionic acid, trimethylacetic acid, tert-butylacetic acid, lauryl sulfuric acid, gluconic acid, glutamic acid, hydroxynaphthoic acid, salicylic acid, stearic acid or muconic acid or (2) a salt formed as an acidic proton present in the parent compound is replaced.

As used herein, "stereoisomers" refer to the compounds which have the same chemical structure but are different in the spatial arrangement of atoms or substituents. The optical isomers (enantiomers) refer to two stereoisomers which are non-superimposable mirror images of each other. The diastereomers refer to the stereoisomers that have two or more chiral centers and are not mirror images of each other.

As used herein, "hydrate" refers to a compound bound with water. It is used in a broad sense, including an inclusion compound which lacks chemical bonding with water.

As used herein, "solvate" refers to a higher-order compound formed between a solute molecule or ion, and a solvent molecule or ion.

Hereinafter, the present invention will be described in detail.

In one aspect, the present invention provides a composition for alleviating skin irritation and suppressing sebum production, including a compound represented by the following Chemical Formula 1, a salt thereof, a stereoisomer thereof, a hydrate thereof or a solvate thereof as an active ingredient.

In one aspect, the present invention provides the use of a compound represented by the following Chemical Formula (1), a salt thereof, a stereoisomer thereof, a hydrate thereof, or a solvate thereof for preparing a composition for alleviating skin irritation.

In one aspect, the present invention provides the use of a compound represented by the following Chemical Formula (1), a salt thereof, a stereoisomer thereof, a hydrate thereof, or a solvate thereof for the preparation of a composition for suppressing sebum production.

[Chemical Formula 1]

Specifically, the compound is (5-hydroxy-4-oxopyran-2-yl)methyl (E)-3-(1,3-benzodioxol-5-yl)prop-2-enoate, also known as Seletinoid G.

In one embodiment, the composition may contain from 0.001% to 2% by weight based on the total weight of the active ingredient composition of the compound represented by Chemical Formula 1, salt thereof, stereoisomer thereof, hydrate thereof, or solvate thereof. When applying the active ingredient to the human body based on a cell test, it is generally treated at 100 to 1000 times the concentration of the cell test. (Clin Chim Acta. 2005 December; 362(1-2):161-9). Specifically, the active ingredient may be contained in an amount of 0.001% by weight or more, 0.005% by weight or more, 0.01% by weight or more, 0.015% by weight or more, 0.02% by weight or more, 0.025% by weight or more, 0.03% by weight or more, 0.035% by weight or more, 0.04% by weight or more, 0.045% by weight or more, 0.05% by weight or more, 0.1% by weight or more, 0.2% by weight or more, 0.3% by weight or more, 0.4% by weight or more, 0.5% by weight or more, 0.6% by weight or more, 0.7% by weight or more, 0.8% by weight or more, 0.9% by weight or more, 0.95% by weight or more, 1% by weight or more, 2% by weight or less, 1.95% by weight or less, 1.9% by weight or less, 1.85% by weight or less, 1.8% by weight or less, 1.75% by weight or less, 1.7% by weight or less, 1.65% by weight or less, 1.6% by weight or less, 1.55% by weight or less, 1.5% by weight or less, 1.45% by weight or less, 1.4% by weight or less, 1.35% by weight or less, 1.3% by weight or less, 1.25% by weight or less, 1.2% by weight or less, 1.15% by weight or less, or 1.1% by weight or less.

In one embodiment, the active ingredient of the compound represented by Chemical Formula 1, salt thereof, stereoisomer thereof, hydrate thereof, or solvate thereof can be administered by various routes, and all modes of administration can be expected. For example, it may be administered by oral administration, intraperitoneal injection, rectal administration, intravenous injection, intramuscular or subcutaneous injection, or percutaneous absorption.

In one embodiment, the active ingredient of the compound represented by Chemical Formula 1, salt thereof, stereoisomer thereof, hydrate thereof, or solvate thereof may be administered to the human body in an amount of 0.1 to 20000 mg/kg/day. The dosage of the active ingredient is determined within the level of those skilled in the art, and the daily dosage of the drug varies depending on various factors such as the skin condition and age of the subject to be administered, but based on healthy adults, the above dosage ranges may generally be administered.

In one embodiment, the active ingredient of the compound represented by Chemical Formula 1, salt thereof, stereoisomer thereof, hydrate thereof, or solvate thereof may be administered orally or by injection in an amount of 0.1 to 15 mg/kg/day. Specifically, if the dosage is converted by assuming that all of the administered active ingredient is absorbed into the human body and the medium containing the cells is the human body, the active ingredient may be administered, for example, in an amount of 0.1 mg/kg/day or more, 0.2 mg/kg/day or more, 0.3 mg/kg/day or more, 0.4 mg/kg/day or more, 0.5 mg/kg/day or more, 0.6 mg/kg/day or more, 0.7 mg/kg/day or more, 0.8 mg/kg/day or more, 0.9 mg/kg/day or more, 1 mg/kg/day or more, 1.1 mg/kg/day or more, 1.2 mg/kg/day or more, 1.3 mg/kg/day or more, 1.4 mg/kg/day or more, 1.5 mg/kg/day or more, 1.6 mg/kg/day or more, 1.7 mg/kg/day or more, 1.8 mg/kg/day or more, 1.9 mg/kg/day or more, 2 mg/kg/day or more, 2.1 mg/kg/day or more, 2.2 mg/kg/day or more, 2.3 mg/kg/day or more, 2.4 mg/kg/day or more, 2.5 mg/kg/day or more, 2.6 mg/kg/day or more, 2.7 mg/kg/day or more, 2.8 mg/kg/day or more, 2.9 mg/kg/day or more, 3 mg/kg/day or more, 15 mg/kg/day or less, 14.5 mg/kg/day or less, 14 mg/kg/day or less, 13.5 mg/kg/day or less, 13 mg/kg/day or less, 12.5 mg/kg/day or less, 12 mg/kg/day or less, 11.5 mg/kg/day or less, 11 mg/kg/day or less, 10.5 mg/kg/day or less, 10 mg/kg/day or less, 9.5 mg/kg/day or less, 9 mg/kg/day or less, 8.5 mg/kg/day or less, 8 mg/kg/day or less, 7.5 mg/kg/day or less, 7 mg/kg/day or less, 6.5 mg/kg/day or less, 6 mg/kg/day or less, 5.5 mg/kg/day or less, 5 mg/kg/day or less, 4.5 mg/kg/day or less, 4 mg/kg/day or less, 3.9 mg/kg/day or less, 3.8 mg/kg/day or less, 3.7 mg/kg/day or less, 3.6 mg/kg/day or less, 3.5 mg/kg/day or less, 3.4 mg/kg/day or less, 3.3 mg/kg/day or less, 3.2 mg/kg/day or less, or 3.1 mg/kg/day or less. In addition, specifically, the dosage may be administered once a day or divided into several doses, and the dosage is not intended to limit the scope of the present invention in any way.

In one embodiment, the skin application amount of the active ingredient of the compound represented by Chemical Formula 1, salt thereof, stereoisomer thereof, hydrate thereof, or solvate thereof as an external preparation may be 10 to 20000 mg/kg/day. Although it depends on various factors such as the skin condition, age, etc. of the subject to be administered, when administered to a healthy adult, the active ingredient may be applied, for example, in an amount of 10 mg/kg/day or more, 50 mg/kg/day or more, 100 mg/kg/day or more, 150 mg/kg/day or more, 200 mg/kg/day or more, 250 mg/kg/day or more, 300 mg/kg/day or more, 350 mg/kg/day or more, 400 mg/kg/day or more, 450 mg/kg/day or more, 500 mg/kg/day or more, 1000 mg/kg/day or more, 2000 mg/kg/day or more, 3000 mg/kg/day or more, 4000 mg/kg/day or more, 5000 mg/kg/day or more, 6000 mg/kg/day or more, 7000 mg/kg/day or more, 8000 mg/kg/day or more, 9000 mg/kg/day or more, 9500 mg/kg/day or more, 10000 mg/kg/day or more, 20000 mg/kg/day or less, 19500 mg/kg/day or less, 19000 mg/kg/day or less, 18500 mg/kg/day or less, 18000 mg/kg/day or less, 17500 mg/kg/day or less, 17000 mg/kg/day or less, 16500 mg/kg/day or less, 16000 mg/kg/day or less, 15500 mg/kg/day or less, 15000 mg/kg/day or less, 14500 mg/kg/day or less, 14000 mg/kg/day or less, 13500 mg/kg/day or less, 13000 mg/kg/day or less, 12500 mg/kg/day or less, 12000 mg/kg/day or less, 11500 mg/kg/day or less, or 11000 mg/kg/day or less divided by one to several times, but the present invention is not limited thereto.

In one embodiment, the composition may be to alleviate the irritation of the skin stimulated by ultraviolet rays.

In one embodiment, the ultraviolet rays may be at least one of UVA and UVB. Ultraviolet rays are classified into UVA, UVB, and UVC according to their wavelength. Among them, UVA has a long wavelength of 320 to 400 nm, and when the skin is exposed to the UVA for a long time, the UVA can reach the dermis and cause skin irritation. UVB has a medium wavelength of 290 to 320 nm and can reach the stratum epidermal layer or the epidermis layer, thereby causing irritation to the skin in a short time. Specifically, the present invention may be to relieve irritation in the skin irritated by each of the above UVA and UVB or UVA and UVB simultaneously.

In one embodiment, the UVA may stimulate the skin by exposing the skin to an amount of light of 5 $J/cm^2$ or more. Because the UVA has a long wavelength, the amount of light is almost constant regardless of day and night, weather, and season, and the amount of light may vary slightly depending on latitude. For example, the UVA may be irradiated to the skin with an amount of light of 5 $J/cm^2$ or more, 5.5 $J/cm^2$ or more, 6 $J/cm^2$ or more, 6.5 $J/cm^2$ or more, 7 $J/cm^2$ or more, 7.5 $J/cm^2$ or more, 8 $J/cm^2$ or more, 8.5 $J/cm^2$ or more, 9 $J/cm^2$ or more, 9.5 $J/cm^2$ or more, 10 $J/cm^2$ or more, 15 $J/cm^2$ or less, 14.5 $J/cm^2$ or less, 14 $J/cm^2$ or less, 13.5 $J/cm^2$ or less, 13 $J/cm^2$ or less, 12.5 $J/cm^2$ or less, 12 $J/cm^2$ or less, 11.5 $J/cm^2$ or less, 11 $J/cm^2$ or less, or 10.5 $J/cm^2$ or less.

In one embodiment, the UVB may stimulate the skin by exposing the skin to an amount of light of 9 $mJ/cm^2$ or more. As the amount of UVB light increases, the degree of skin irritation increases. The amount of light may be calculated based on the following UV index table and the following formula provided by the Korea Meteorological Administration, based on a person with normal skin irritation.

| Step | UV index | Response and Action |
| --- | --- | --- |
| Danger | 11 or more | When exposed to the sun, it is the most dangerous as it can burn the skin within tens of minutes. |
| Very high | 8 or more to less than 11 | When exposed to the sun, it is very dangerous as it can burn the skin within a few tens of minutes. |
| High | 6 or more to less than 8 | When exposed to the sun, it is dangerous as it can burn the skin within 1 to 2 hours. |
| Moderate | 3 or more to less than 8 | Even within 2-3 hours of exposure to the sun can cause skin burns |
| Low | Less than 3 | No sun exposure protection required However, those with sun-sensitive skin should apply sunscreen. |

UV index=UV intensity $F(25\ mW/m^2)/25$

For example, when the skin is exposed for 3 hours at an intensity of UV index 1, the total amount of light is 1×0.0025×60×60×3=27 mJ/cm$^2$, and when the skin is exposed for 2 hours at an intensity of UV index 2, the total amount of light is 2×0.0025×60×60×2=36 mJ/cm$^2$. Although this amount of light may appear differently depending on an individual's skin irritation, the irritation of the skin may increase proportionally according to this amount of light.

Unlike the UVA, the UVB shows a significant difference in the amount of light depending on the weather environment of the day, which is cloudy or clear, also shows a difference depending on the altitude of a mountain or flat land, and shows a significant difference in the amount of UV light depending on the background environment such as a swimming pool or the sea. Therefore, it is necessary to adjust the dosage of the composition for alleviating skin irritation according to the amount of ultraviolet light as shown in the table below.

| Exposure dose of light (mJ/cm$^2$) | Oral or injection dose (mg/kg/day) | Amount of applied to skin (mg/kg/day) |
| --- | --- | --- |
| 9 or more to less than 27 | 0.1 or more to less than 5 | 10 or more to less than 1000 |
| 27 or more to less than 54 | 5 or more to less than 10 | 1000 or more to less than 10000 |
| 54 or more to 100 or less | 10 or more to 15 or less | 10000 or more to 20000 or less |

Specifically, in the case of irradiated skin exposed to the UVB with a light amount of 9 mJ/cm$^2$ or more to less than 27 mJ/cm$^2$, the oral or injection dosage of the active ingredient may be 0.1 mg/kg/day or more to less than 5 mg/kg/day; in the case of irradiated skin exposed to the UVB with a light amount of 27 mJ/cm$^2$ or more to less than 54 mJ/cm$^2$, the oral or injection dosage of the active ingredient may be 5 mg/kg/day or more to less than 10 mg/kg/day; or in the case of irradiated skin exposed to the UVB with a light amount of 54 mJ/cm$^2$ to 100 mJ/cm$^2$, the oral or injection dosage of the active ingredient may be 10 mg/kg/day to 15 mg/kg/day.

In addition, in the case of irradiated skin exposed to the UVB with a light amount of 9 mJ/cm$^2$ or more to less than 27 mJ/cm$^2$, the skin application amount of the active ingredient may be 10 mg/kg/day or more to less than 1000 mg/kg/day; in the case of irradiated skin exposed to the UVB with a light amount of 27 mJ/cm$^2$ or more to less than 54 mJ/cm$^2$, the skin application amount of the active ingredient may be 1000 mg/kg/day or more to less than 10000 mg/kg/day; or in the case of irradiated skin exposed to the UVB with a light amount of 54 mJ/cm$^2$ to 100 mJ/cm$^2$, the skin application amount of the active ingredient may be 10000 mg/kg/day or more to less than 20000 mg/kg/day.

In one embodiment, the skin stimulated by the ultraviolet light has an increased expression level of one or more factors from the group consisting of interleukin-1 alpha (IL-1α), Interleukin-8 (IL-8), and prostaglandin E2 (PEG2). and the composition may reduce the expression level of the one or more factors. Specifically, it is known that UV light increases the expression levels of IL-1α, IL-8, and PEG2, known as inflammatory factors, in cells, thereby increasing skin irritation. Accordingly, upon the application of the composition, the expression level of one or more inflammatory factors from the group consisting of IL-1α, IL-8, and PEG2 may decrease.

In one embodiment, the composition may reduce the expression level of one or more factors from the group consisting of IL-1α, IL-8, and PEG2 by 20 to 80% based on the skin stimulated by ultraviolet rays. Specifically, the expression level of the inflammatory factor may be reduced by 20% or more, 25% or more, 30% or more, 35% or more, 40% or more, 45% or more, 50% or more, 80% or less, 75% or less, 70% or less, 65% or less, 60% or less, or 55% or less, based on the expression level of the inflammatory factor in cells not irradiated with the UV light.

In one embodiment, the cell may be a keratinocyte.

In one embodiment, the composition may reduce intracellular lipid synthesis.

In one embodiment, the decrease in lipid synthesis may be to decrease gene expression of transcription factors involved in lipid synthesis. Specifically, the factors involved in lipid synthesis and metabolism in cells promote the lipid synthesis pathway when the gene expression level increases.

In one embodiment, the transcription factor may be one or more selected from the group consisting of sterol-regulatory element binding protein 1 (SREBP1), sterol-regulatory element binding protein 2 (SREBP2), fatty acid synthase (FAS), and acetyl-CoA carboxylase (ACACA). Specifically, the lipid metabolism-related factors commonly have a transcriptional regulatory region called SRE. In particular, sterol regulatory element-binding protein (SREBP) binds to the sterol regulatory element (SRE), which is a transcriptional regulatory region of a gene by sterols, and regulates the production of lipids including cholesterol and fatty acids. The SREBP exists in three isomers, and SREBP-1a and SREBP-1c are derived from one gene and use different transcription initiation sites. The other isomer, SREBP-2 is transcribed from other genes and is involved in cholesterol homeostasis and functions similar to the above two isomers. Therefore, inhibition of the production of FAS and ACACA, including SREBP, which are involved in lipid synthesis, is important for the inhibition of sebum production (Journal of Investigative Dermatology (2013) 133, 429-440).

In one embodiment, the composition may reduce the gene expression of the transcription factor by 20% or more. For example, when the composition is applied, the expression of the transcription factor may be reduced by 20% or more, 25% or more, 30% or more, 35% or more, 40% or more, 45% or more, 50% or more, 55% or more, 60% or more, 65% or more, 70% or more, 75% or more, or 80% or more.

In one embodiment, the cell may be a sebaceous gland cell.

In one embodiment, the composition may be an external preparation for the skin, and the external preparation for skin may include any one that can be externally applied to the skin.

Various types of cosmetics and medicines may be included therein.

In one embodiment, the composition may be a cosmetic composition. The cosmetic composition may be provided as a cosmetic product having a formulation using a cosmetically or dermatologically acceptable medium or base. Such formulations include any forms suitable for topical application, and particular examples thereof include solution, gel, solid, anhydrous slurry products, oil in water emulsion, suspension, microemulsion, microcapsules, microgranules, or ionic (liposome) and non-ionic follicular dispersion, or cream, skin, lotion, powder, ointment, spray, or conceal stick. Such compositions may be prepared by a commonly employed method in the art. The composition according to the present invention may be used in the form of foam or an aerosol composition further including a pressurized propellant, There is no particular limitation in formulation of the cosmetic composition according to an embodiment of the present invention. For example, the cosmetic composition may be formulated as softening lotion, astringent lotion, nourishing lotion, nourishing cream, massage cream, essence, eye cream, eye essence, cleansing cream, cleansing foam, cleansing water, pack, powder, body lotion, body cream, body oil, body essence, and the like.

In one embodiment, the composition may be pharmaceutical composition. The pharmaceutical composition may further contain a pharmaceutical adjuvant such as preservative, stabilizer, wetting agent, emulsifier, salt for control of osmotic pressure, and/or buffer, etc. or other therapeutically useful agents, and may be prepared into formulations for oral or parenteral administration according to methods commonly employed in the art.

In one embodiment, the composition may be a food composition. The food composition may be a liquid or solid formulation, and may be a tablet, a capsule, a soft capsule, a pill, a granule, a beverage (drink), a diet bar, a chocolate, a caramel, or confectionery, although not being particularly limited thereto. The food composition of the present disclosure may contain, in addition to the active ingredient, an excipient, a sugar, a fragrance, a colorant, an oil or fat, a protein, etc., as desired.

In the present specification, in particular, in the test examples to be described later, the effect of the composition is tested on human skin keratinocytes, not animals such as rats, and it can be clearly seen that there is a reduction effect of inflammatory factors when the composition is applied to the human body as cosmetics, food, etc.

Hereinafter, the present invention will be described in further detail by way of examples. These examples are merely intended to facilitate the understanding of the present invention, and the scope of the present invention is not limited thereto. It will be understood by those skilled in the art that variations, substitutions, and insertions which are commonly well-known can be made to the present invention, and these are also included within the scope of the present invention.

[Example 1] Culturing of Keratinocytes and UV Irradiation

Figure 1:
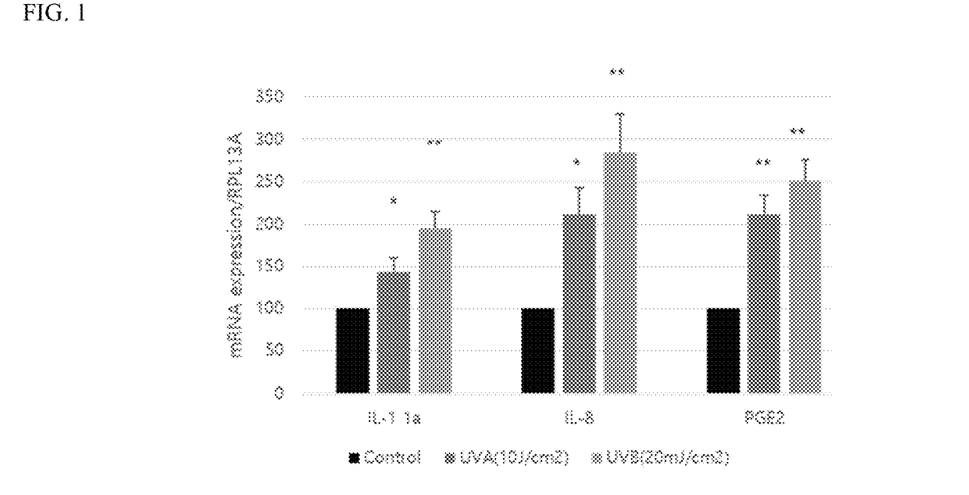
FIG. 1 is a graph showing the effect of increasing inflammatory factors by UVA and UVB.

Neonatal keratinocytes (normal human epidermal keratinocytes: P988, Lonza) were dispensed in a 60 mm cell culture dish at a density of $1.25 \times 10^4$ cells/dish using Keratinocyte Growth Medium (KGM), and then cultured in a $CO_2$ incubator under the condition of 37° C. and 5% $CO_2$ at about 80% confluency. Thereafter, the cells were irradiated with the UVAs with the total amount of 10 J/cm$^2$ and the UVB with the total amount of 25 mJ/cm$^2$, respectively, and after culturing the cells for 2 days, changes in inflammatory markers were confirmed. As a result, as shown in FIG. 1, it was confirmed that that the inflammatory factors related to irritation induction by the UVA and UVB irradiation were statistically significantly reduced.

[Example 2] Inflammatory Cytokine Gene Analysis

After the UV irradiation as in Example 1, 0 μM, 1 μM or 10 μM of the compound of Chemical Formula 1 (Seletinoid G) were injected into the medium, and the cells were cultured for 2 days. After removing the cell growth medium, 1 ml of Trizol (Invitrogen) was added to the cells, and RNA was isolated from the cells according to the RNA isolation method (Invitrogen). The RNA was quantified using a UV detector (HEWLETT PACKARD) at 260 nm and subject to RT-PCR (reverse transcription-polymerase chain reaction) to observe the change in the expression level of each inflammatory factor. Specifically, taqman probes (Hs00174092_m1, Hs00168755_m1, Hs00174103-m1) were used for genetic analysis of IL-1α, PGE2 and IL-8 for each sample, and normalization was performed with respect to the complementary gene RPL13A (Hs04194366_g1).

Figure 2:
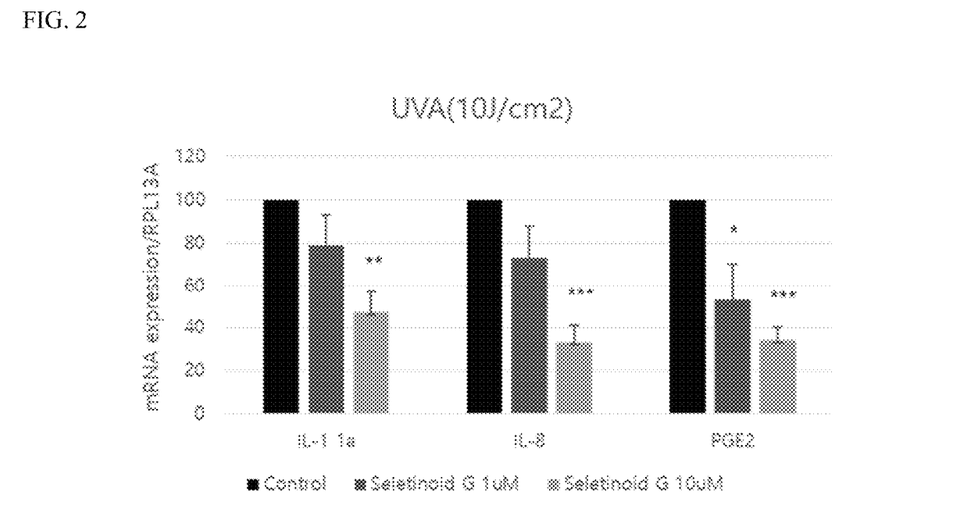
FIG. 2 is a graph confirming the reduction effect of inflammatory factors when the compound of Chemical Formula 1 is treated by concentration on the skin cells stimulated by UVA.

As shown in FIG. 2, when 1 μM of the compound of Chemical Formula 1 (Seletinoid G) was injected into the UVA-irradiated cells, it was confirmed that the expression level of IL-1a was reduced by about 5 to 20%, the expression level of IL-8 was reduced by about 10 to 30%, and the expression level of PEG2 was reduced by about 30 to 50%. Also, when 10 μM of the compound was injected into the cells, it was confirmed that the expression level of IL-1a was reduced by about 40 to 55%, the expression level of IL-8 was reduced by about 60 to 90%, and the expression level of PGE2 was reduced by about 60 to 65%.

Figure 3:
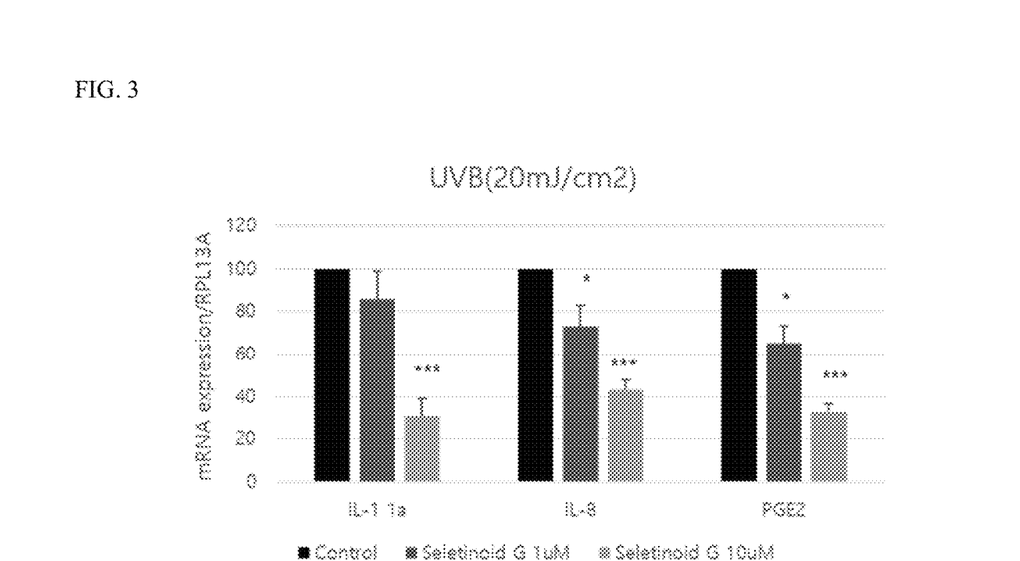
FIG. 3 is a graph confirming the reduction effect of inflammatory factors when the compound of Chemical Formula 1 is treated by concentration on the skin cells stimulated by UVB.

Also, as shown in FIG. 3, when 1 μM of the compound of Chemical Formula 1 (Seletinoid G) was injected into the UVB-irradiated cells, it was confirmed that the expression level of IL-1a was reduced by about 1 to 15%, the expression level of IL-8 was reduced by about 20 to 25%, and the expression level of PGE2 was reduced by about 30 to 35%. Also, when 10 μM of the compound was injected into the cells, it was confirmed that the expression level of IL-1a was reduced by about 60 to 70%, the expression level of IL-8 was reduced by about 50 to 55%, and the expression level of PGE2 was reduced by about 65 to 70%.

[Example 3] Sebaceous Gland Cell Culture

Primary sebocyte and human sebocyte complete medium were purchased from Celprogen and used. The sebaceous gland cells were dispensed in a 60 mm cell culture dish at a density of $1.25 \times 10^4$ cells/dish, and then cultured in a $CO_2$ incubator under the condition of 37° C. and 5% $CO_2$ at about 80% confluency. Thereafter, 0 μM, 1 μM, and 10 μM of the compound of Chemical Formula 1 (Seletinoid G) were treated with the cells, respectively, and the cells were cultured for 2 days, and then changes in transcription factors related to sebum biosynthesis were confirmed.

[Example 4] Genetic Analysis of Cholesterol/Fatty Acid Transcription Factors

The cells were treated with the material of Example 3, and then, cultured for 2 days, and then, the cell growth medium was removed. After that, 1 ml of Trizol (Invitrogen) was added to the cells, and RNA was isolated from the cells according to the RNA isolation method (Invitrogen). The RNA was quantified using a UV detector (HEWLETT PACKARD) at 260 nm and subject to RT-PCR (reverse transcription-polymerase chain reaction).

Figure 4:
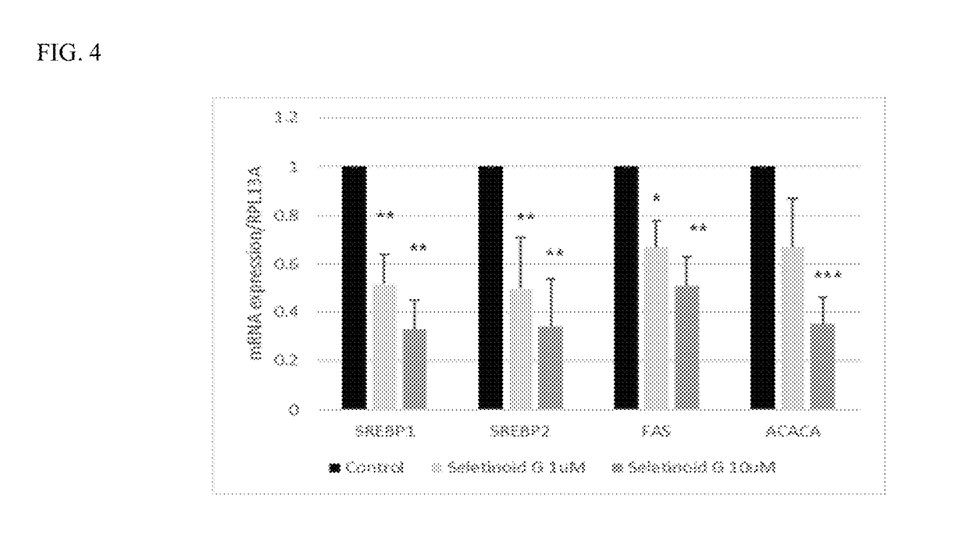
FIG. 4 is a graph confirming the reduction effect of lipid/cholesterol metabolism transcription factors when the compound of Chemical Formula 1 is treated by concentration.
Figure 5:
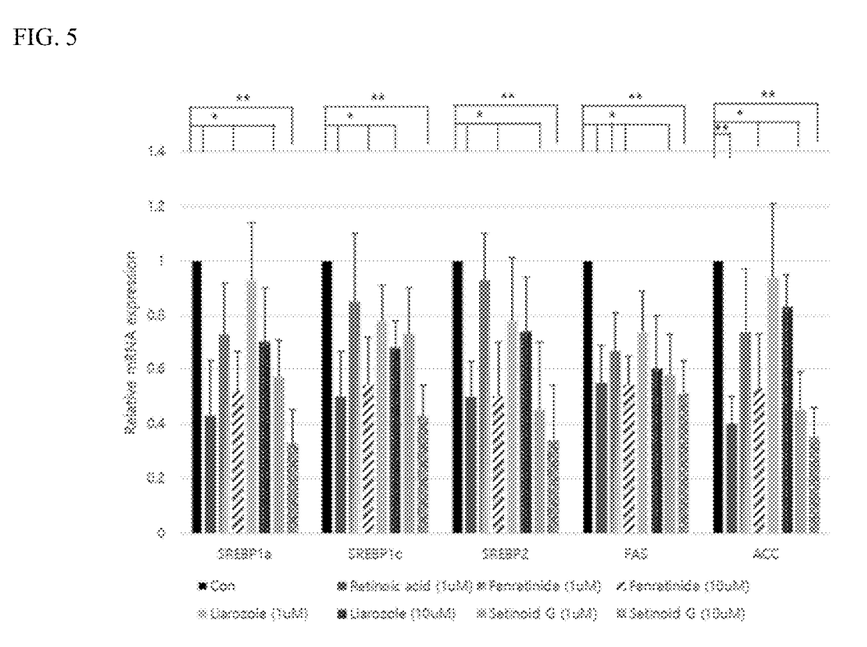
FIG. 5 is a graph comparing the reduction effect of lipid/cholesterol metabolism transcription factors when retinoic acid signal transduction pathway modifier is treated.

Taqman probes were used for genetic analysis of SREBP1 (Hs02561944_s1), SREBP2(Hs01081781_m1), fatty acid synthase(FAS: Hs01005622_m1), Acetyl-CoA Carboxylase (ACACA: Hs01046047_m1) for each sample, and normalization was performed with respect to the complementary gene RPL13A (Hs04194366_g1), and the result is shown in FIG. 4.

As a result, when 1 μM of compound 1 was treated with the cells, the expression levels of SREBP1, SPERBP2, FAS, and ACACA were reduced by about 40%, 40%, 30% and 30%, respectively, and when 10 Mm of the compound 1 were treated with the cells, the expression levels of SREBP1, SPERBP2, FAS, and ACACA were reduced by about 60%, 55%, 45% and 60%, respectively.

[Example 5] Comparison of Retinoic Acid Signal Transduction Pathway Modifier

For comparison of the sebum-suppressing effects of retinoic acid, fenretinide, liarozole, and seletinoid G, the cells were treated with 1 μM and 10 μM of each material, and the gene expression levels of SREBP1, SPERBP2, FAS, and ACACA were compared as in Example 4.

When the cells were treated with 10 μM of retinoic acid, it was not possible to measure the gene expression level due to some cytotoxicity, but the gene expression levels of the other materials could be measured even at a concentration of 10 μM. In the case of seletinoid G, retinoic acid, and fenretinide, there was the effect of suppressing sebum-related gene expression, but liarozole did not show a significant difference.

It was found that the gene expression level was further lowered in the case of treatment with 1 μM of retinoic acid compared to the case of treatment with Seletinoid G (1 μM). However, in order to reduce the expression level of the SREBP1a, SPERBP2, FAS, and ACACA genes by more than 60%, a higher concentration of material treated is required, but the retinoid acid cannot be applied at a higher concentration due to cytotoxicity, which means that retinoid acid cannot reduce the expression levels of the genes by 60% or more. In contrast, it was found that seletinoid G was able to reduce the expression level of the transcription factors by more than 60%, relatively the most, without causing cytotoxicity even at a concentration of 10 μM (FIG. 2). This is because that although retinoic acid and seletinoid G are structurally similar to each other, the retinoic acid non-specifically binds to a retinoic acid receptor (RAR), whereas the seletinoid G specifically binds to RARγ, so that there is a functional difference in regulating the retinoic acid signal transduction pathway (Paper published in the Society of Cosmetic Scientists of Korea (2003) 09b, 184-191).

[Example 6] Sebum-Suppressing Effect Experiment of Seletinoid G

A formulation containing the seletinoid G and a formulation without the seletinoid G (control group) were prepared through the formulation of Table 1 below. After applying the formulations to each forehead of 5 young males (mean age of 32±2 years), the amount of skin secretion was compared using a sebutape patch and Sebumeter® SM 815 after 2 hours. In the case of the sebutape patch, after applying the formulations to the forehead of the males for 6 hours, the formulations were washed thoroughly with water or detergent, and the sebutape patch was applied to the area where the formulations were applied for 2 hours and then removed, and then the amount of sebum secreted in the sebutape patch was observed. Also, in the case of the sebumeter, the amount of sebum secreted was measured by attaching a sensor to the skin at the site next to the site where the sebutape patch was applied.

Figure 6:
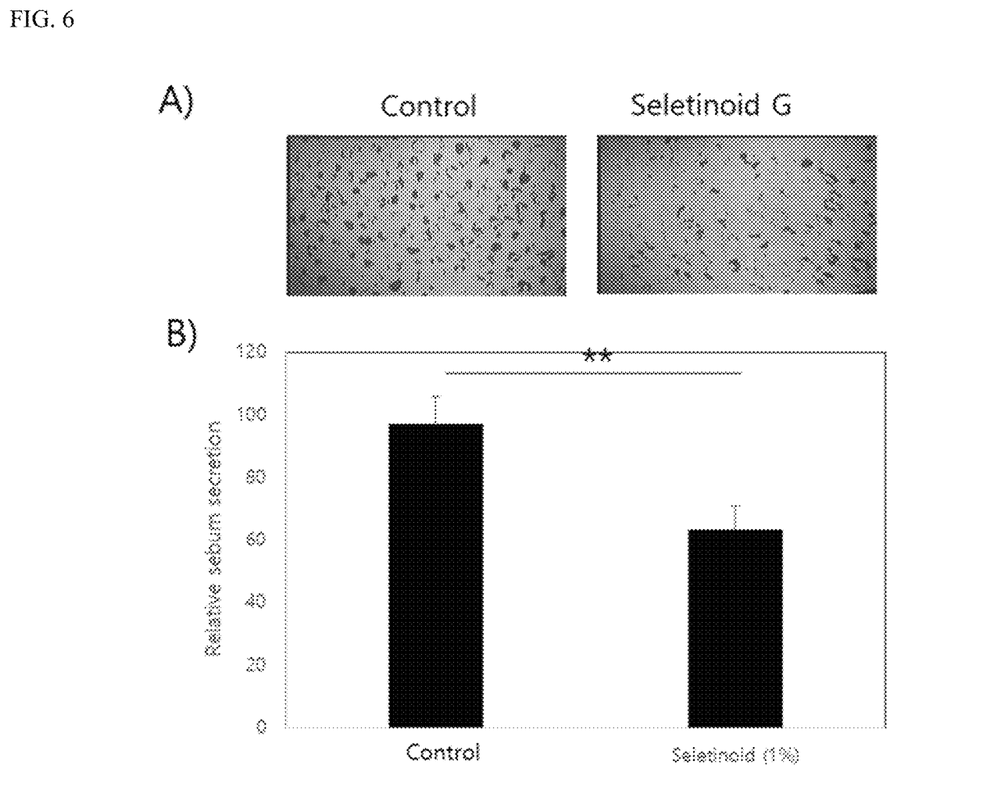
FIG. 6 is an image and graph confirming the sebum suppression effect of the compound of Chemical Formula 1.

In the case of the Sebutape patch, the secretion of the sebum was reduced in the group applied with the seletinoid G-containing product was applied (A in FIG. 6). Also, when the secretion of the sebum was measured with Sebumeter® SM 815, the group applied with the seletinoid G-containing product showed the effect of reducing the sebum by about 40% compared to the control group (B in FIG. 6).

Formulation examples of the composition according to one aspect of the present specification are described below, but the composition may be also applicable as various other formulations, which are not intended to limit the present specification, but merely to describe in detail.

[Formulation Example 1] Softening Lotion (Skin Lotion)

A softening lotion was prepared according to a commonly employed method with the composition described in the table below.

TABLE 1

| | Content (wt %) | |
|---|---|---|
| Ingredients | Control | Formulation Example 1 |
| Seletinoid G | — | 1.0 |
| Glycerin | 3.0 | 3.0 |
| Butylene glycol | 2.0 | 2.0 |
| Propylene glycol | 2.0 | 2.0 |
| Carboxyvinyl polymer | 0.1 | 0.1 |
| PEG-12 nonylphenyl ether | 0.2 | 0.2 |
| Polysorbate 80 | 0.4 | 0.4 |
| Ethanol | 10.0 | 10.0 |
| Triethanolamine | 0.1 | 0.1 |
| Antiseptic, colorant, fragrance | adequate | adequate |
| Purified water | balance | balance |

[Formulation Example 2] Nourishing Lotion

A nourishing lotion was prepared according to a commonly employed method with the composition described in the table below.

TABLE 2

| Ingredients | Content (wt %) |
|---|---|
| Seletinoid G | 1.0 |
| Polysorbate 60 | 1.5 |
| Sorbitan Sesquioleate | 0.5 |
| PEG 60 hydrogenated caster oil | 2.0 |
| Liquid paraffin | 10.0 |
| Squalane | 5.0 |
| Caprylic/Capric Triglyceride | 5.0 |
| Glycerin | 5.0 |
| Butylene glycol | 3.0 |
| Propylene glycol | 3.0 |
| Triethanolamine | 0.2 |
| Antiseptic, colorant, fragrance | adequate |
| Purified water | balance |

[Formulation Example 3] Massage Cream

A massage cream was prepared according to a commonly employed method with the composition described in the table below.

TABLE 3

| Ingredients | Content (wt %) |
|---|---|
| Seletinoid G | 1.0 |
| Beeswax | 10.0 |
| Polysorbate 60 | 1.5 |
| Sorbitan Sesquioleate | 0.5 |
| PEG 60 hydrogenated caster oil | 2.0 |
| Liquid paraffin | 10.0 |
| Squalane | 5.0 |

TABLE 3-continued

| Ingredients | Content (wt %) |
| --- | --- |
| Caprylic/Capric Triglyceride | 5.0 |
| Glycerin | 5.0 |
| Butylene glycol | 3.0 |
| Propylene glycol | 3.0 |
| Triethanolamine | 0.2 |
| Antiseptic, colorant, fragrance | adequate |
| Purified water | balance |

[Formulation Example 4] Pack

A pack was prepared according to a commonly employed method with the composition described in the table below.

TABLE 4

| Ingredients | Content (wt %) |
| --- | --- |
| Seletinoid G | 1.0 |
| Polyvinyl alcohol | 13.0 |
| Sodium Carboxymethyl Cellulose | 0.2 |
| Glycerin | 5.0 |
| Allantoin | 0.1 |
| Ethanol | 6.0 |
| PEG-12 nonylphenyl ether | 0.3 |
| Polysorbate 60 | 0.3 |
| Antiseptic, colorant, fragrance | adequate |
| Purified water | balance |

[Formulation Example 5] Gel

A gel was prepared according to a commonly employed method with the composition described in the table below.

TABLE 5

| Ingredients | Content (wt %) |
| --- | --- |
| Seletinoid G | 1.0 |
| Sodium ethylenediaminetetraacetate | 0.05 |
| Glycerin | 5.0 |
| Carboxyvinyl polymer | 0.3 |
| Ethanol | 5.0 |
| PEG 60 hydrogenated caster oil | 0.5 |
| Triethanolamine | 0.3 |
| Antiseptic, colorant, fragrance | adequate |
| Purified water | balance |

[Formulation Example 6] Ointment

An ointment was prepared according to a commonly employed method with the composition described in the table below.

TABLE 6

| Ingredients | Content (wt %) |
| --- | --- |
| Seletinoid G | 1.0 |
| Glycerin | 8.0 |
| Butylene glycol | 4.0 |
| Liquid paraffin | 15.0 |
| β-Glucan | 7.0 |
| Carbomer | 0.1 |
| Caprylic/Capric Triglyceride | 3.0 |
| Squalane | 1.0 |
| Cetearyl glucoside | 1.5 |
| Sorbitan stearate | 0.4 |
| Cetearyl alcohol | 1.0 |
| Beeswax | 4.0 |
| Antiseptic, colorant, fragrance | adequate |
| Purified water | balance |

[Formulation Example 7] Capsule 150 mg of seletinoid G, 2.5 mg of vitamin C, 2 mg of palm oil, 8 mg of hydrogenated palm oil, 4 mg of yellow wax, and 6 mg of lecithin were mixed with each other, and 400 mg of the mixture was filled in each capsule according to a commonly employed method to prepare a capsule.

[Formulation Example 8] Tablet 150 ng of seletinoid G, 2.5 mg of vitamin C, 100 mg of glucose, 96 ng of starch, and 4 mg of magnesium stearate were mixed with each other, 40 mg of 30% ethanol was added thereto to form granules. The granules were dried at 60° C. and compressed into a tablet using a tableting machine.

[Formulation Example 9] Granule 150 mg of seletinoid G, 150 mg of vitamin C, 100 mg of glucose and 600 mg of starch were mixed with each other, and 100 mg of 30% ethanol was added thereto to form granules. The granules were dried at 60° C., and then filled in a bag.

[Formulation Example 10] Drink 150 mg of seletinoid G, 2.5 mg of vitamin C, 10 g of glucose, 2 g of citric acid, and 187.8 g of purified water were mixed with each other, filling a bottle with 200 mL, and sterilized at 130° C. for 4 to 5 seconds to prepare a drink.

EMBODIMENTS

Embodiment 1: A method for alleviating skin irritation, which comprises administering a composition comprising compound represented by the following Chemical formula 1, a salt thereof, a stereoisomer thereof, a hydrate thereof, or a solvate thereof as an active ingredient to a subject in need of alleviating skin irritation:

[Chemical Formula 1]

Embodiment 2: A method for inhibiting sebum production, which comprises administering a composition comprising a compound represented by the following Chemical formula 1, a salt thereof, a stereoisomer thereof, a hydrate thereof, or a solvate thereof as an active ingredient to a subject in need of inhibiting sebum production:

[Chemical Formula 1]

Embodiment 3: in Embodiment 1 or 2, the method in which the composition includes 0.001% by weight or more to less than 2% by weight of the compound represented by the above Chemical formula 1, the salt thereof, the stereoisomer thereof, the hydrate thereof, or the solvate thereof, based on a total weight of the composition.

Embodiment 4: in any one of Embodiments 1 to 3, the method in which the compound represented by the above Chemical formula 1, the salt thereof, the stereoisomer thereof, the hydrate thereof, or the solvate thereof is administered to the human body in an amount of 0.1 to 20000 mg/kg/day.

Embodiment 5: in any one of Embodiments 1 to 4, the method in which the compound represented by the above Chemical formula 1, the salt thereof, the stereoisomer thereof, the hydrate thereof, or the solvate thereof the active ingredient is administered orally or by injection in an amount of 0.1 to 15 mg/kg/day.

Embodiment 6: in any one of Embodiments 1 to 4, the method in which the compound represented by the above Chemical formula 1, the salt thereof, the stereoisomer thereof, the hydrate thereof, or the solvate thereof is applied to the skin in an amount of 10 to 20000 mg/kg/day.

Embodiment 7: in any one of Embodiments 1 and 3 to 6, the method in which the composition relieves the irritation of the skin stimulated by an ultraviolet ray.

Embodiment 8: in Embodiment 7, the method in which the ultraviolet ray is at least one of UVA and UVB.

Embodiment 9: in Embodiment 8, the method in which the UVA is irradiated to the skin with an amount of light of 5 J/cm$^2$ or more to stimulate the skin.

Embodiment 10: in Embodiment 8, the method in which the UVB is irradiated to the skin with an amount of light of 9 J/cm$^2$ or more to stimulate the skin.

Embodiment 11: in any one of Embodiments 7 to 10, the method in which in a cell of the skin stimulated by the ultraviolet ray, one or more factors of the group consisting of interleukin-1 alpha (IL-1α), interleukin-8 (IL-8), and prostaglandin E2 (PEG2) have an increased expression level, compared to the cell of the skin that is not irradiated with the ultraviolet ray.

Embodiment 12: in Embodiment 11, the method in which the composition reduces the expression level of the one or more factors from the group consisting of the IL-1α, the IL-8, and the PEG2 by 20% or more, based on the skin stimulated by the ultraviolet ray.

Embodiment 13: in Embodiment 11 or 12, the method in which the cell is a keratinocyte.

Embodiment 14: in Embodiment 2, the method in which the composition is to reduce intracellular lipid synthesis.

Embodiment 15: in Embodiment 14, the method in which the reduction in the lipid synthesis reduces the gene expression of the transcription factors involved in the lipid synthesis.

Embodiment 16: in Embodiment 15, the method in which the transcription factor is one or more selected from the group consisting of sterol-regulatory element binding protein 1 (SREBP1), sterol-regulatory element binding protein 2 (SREBP2), fatty acid synthase (FAS), and acetyl-CoA carboxylase (ACACA).

Embodiment 17: in Embodiment 15 or 16, the method in which the composition reduces the gene expression of the transcription factor by 20% or more.

Embodiment 18: in Embodiment 14 to 17, the method in which the cell is a keratinocyte.

Embodiment 19: in any one of Embodiments 1 to 4 and 6 to 18, the method in which the composition is an external preparation for the skin.

Embodiment 20: in any one of Embodiments 1 to 4 and 6 to 18, the method in which the composition is a cosmetic composition.

Embodiment 21: in any one of Embodiments 1 to 18, the method in which the composition is a pharmaceutical composition.

Embodiment 22: in any one of Embodiments 1 to 5 and 7 to 18, the method in which the composition is a food composition.

Embodiment 23: A method for alleviating the irritation of the skin with increased irritation by ultraviolet stimulation, which comprises administering a composition comprising a compound represented by the following Chemical formula 1, a salt thereof, a stereoisomer thereof, a hydrate thereof, or a solvate thereof as an active ingredient to a subject in need of alleviating the irritation of the skin with increased irritation by ultraviolet stimulation:

[Chemical Formula 1]

Embodiment 24: in Embodiment 23, the method in which the composition includes 0.001% by weight or more to less than 2% by weight of the compound represented by the following Chemical formula 1, the salt thereof, the stereoisomer thereof, the hydrate thereof, or the solvate thereof, based on a total weight of the composition.

Embodiment 25: in any one of Embodiment 23 or 24, the method in which the compound represented by the above Chemical formula 1, the salt thereof, the stereoisomer thereof, the hydrate thereof, or the solvate thereof is administered to the human body in an amount of 0.1 to 20000 mg/kg/day.

Embodiment 26: in any one of Embodiment 23 to 25, the method in which the compound represented by the above Chemical formula 1, the salt thereof, the stereoisomer thereof, the hydrate thereof, or the solvate thereof is applied to the skin in an amount of 10 to 20000 mg/kg/day.

Embodiment 27: in any one of Embodiments 23 to 26, the method in which the composition relieves the irritation of the skin stimulated by an ultraviolet ray.

Embodiment 28: in Embodiment 27, the method in which the ultraviolet ray is at least one of UVA and UVB.

Embodiment 29: in Embodiment 27, the method in which the UVA is irradiated to the skin with an amount of light of 5 $J/cm^2$ or more to stimulate the skin.

Embodiment 30: in Embodiment 27, the method in which the UVB is irradiated to the skin with an amount of light of 9 $mJ/cm^2$ or more to stimulate the skin.

Embodiment 31: in any one of Embodiments 23 to 30, the method in which in a cell of the skin stimulated by the ultraviolet ray, one or more factors of the group consisting of interleukin-1 alpha (IL-1α), interleukin-8 (IL-8), and prostaglandin E2 (PEG2) have an increased expression level, compared to the cell of the skin that is not irradiated with the ultraviolet ray.

Embodiment 32: in Embodiment 31, the method in which the composition reduces the expression level of the one or more factors from the group consisting of the IL-1α, the IL-8, and the PEG2 by 20% or more, based on the skin stimulated by the ultraviolet ray.

Embodiment 33: in Embodiment 31 or 32, the method in which the cell is a keratinocyte.

What is claimed is:

1. A method for alleviating skin irritation, which comprises administering a composition comprising a compound represented by a following Chemical Formula 1, a salt thereof, a stereoisomer thereof, a hydrate thereof or a solvate thereof as an active ingredient to a subject in need of alleviating skin irritation:

[Chemical Formula 1]

wherein the composition relieves irritation of the skin stimulated by an ultraviolet ray, wherein the skin irritation stimulated by the ultraviolet ray comprises itching, stinging, burning, pulling, flaking, redness, rashes, or blisters, and wherein the administering reduces the level of one or more factors of the group consisting of interleukin-1 alpha (IL-1α), interleukin-8 (IL-8), and prostaglandin E2 (PEG2) in a cell of the skin stimulated by an ultraviolet ray.

2. The method according to claim 1, wherein the composition comprises 0.001% by weight or more to less than 2% by weight of the active ingredient based on a total weight of the composition.

3. The method according to claim 1, wherein the active ingredient is administered to a human body in an amount of 0.1 to 20000 mg/kg/day.

4. The method according to claim 1, wherein the ultraviolet ray is at least one of UVA and UVB.

5. The method according to claim 4, wherein the UVA is irradiated to the skin with an amount of light of 5 $J/cm^2$ or more to stimulate the skin, or wherein the UVB is irradiated to the skin with an amount of light of 9 $mJ/cm^2$ or more to stimulate the skin.

6. The method according to claim 1, wherein the composition reduces the expression level of the one or more factors from the group consisting of the IL-1α, the IL-8, and the PEG2 by 20% or more, based on the skin stimulated by the ultraviolet ray.

7. The method according to claim 1, wherein the cell is a keratinocyte.

8. The method according to claim 1, wherein the composition is an external preparation for the skin.

9. The method according to claim 1, wherein the composition is a cosmetic composition, pharmaceutical composition or food composition.

* * * * *